(12) United States Patent
Sato (10) Patent No.: US 7,627,319 B2
(45) Date of Patent: Dec. 1, 2009

(54) MOBILE TERMINAL

(75) Inventor: Toshihiko Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 611 days.

(21) Appl. No.: 10/974,609

(22) Filed: Oct. 27, 2004

(65) Prior Publication Data

US 2006/0009211 A1    Jan. 12, 2006

(30) Foreign Application Priority Data

Jun. 16, 2004    (JP)    ............... 2004-178375

(51) Int. Cl.
| | |
|---|---|
| H04W 36/00 | (2009.01) |
| H04W 72/00 | (2009.01) |
| H04B 7/00 | (2006.01) |
| H04W 4/00 | (2009.01) |

(52) U.S. Cl. ............. 455/437; 455/452.2; 455/517; 455/522; 455/525; 370/332

(58) Field of Classification Search ............. 455/436, 455/437, 452.2, 512, 522, 525, 515, 517, 455/524

See application file for complete search history.

(56) References Cited

U.S. PATENT DOCUMENTS

| | | | | |
|---|---|---|---|---|
| 5,978,657 | A * | 11/1999 | Suzuki ............. | 455/522 |
| 6,504,828 | B1 | 1/2003 | Corbett | |
| 6,539,233 | B1 * | 3/2003 | Taketsugu ............. | 455/522 |
| 6,842,616 | B2 * | 1/2005 | Takano et al. ............. | 455/435.2 |
| 6,912,405 | B2 * | 6/2005 | Hiramatsu et al. ............. | 455/522 |
| 6,934,544 | B2 * | 8/2005 | Cooper et al. ............. | 455/435.2 |
| 2003/0073455 | A1 * | 4/2003 | Hashem et al. ............. | 455/525 |
| 2003/0220109 | A1 * | 11/2003 | Jami et al. ............. | 455/437 |
| 2004/0157608 | A1 * | 8/2004 | Kurose et al. ............. | 455/436 |

FOREIGN PATENT DOCUMENTS

| | | |
|---|---|---|
| CN | 1357207 | 7/2002 |
| JP | 08-256102 | 10/1996 |
| JP | 2000-201368 | 7/2000 |
| WO | 00/54540 | 9/2000 |

OTHER PUBLICATIONS

Chinese Office Action dated Jun. 5, 2009, from the corresponding Chinese Application.

* cited by examiner

*Primary Examiner*—George Eng
*Assistant Examiner*—Un C Cho
(74) *Attorney, Agent, or Firm*—Katten Muchin Rosenman LLP (57) ABSTRACT

The invention relates to a mobile terminal that intends to increase channel capacity and transmission quality properly within the confines of costs. The invention provides a mobile terminal including measuring section measuring a downstream transmission loss using a pilot signal transmitted from each radio base station; and selecting section comparing transmitting power of a pilot signal corresponding to the lowest measured transmission loss with transmitting power of pilot signals for each of which a difference between a corresponding measured transmission loss and a lowest measured transmission loss is smaller than a prescribed value, and selecting, as an origination destination or handover destination, a radio base station that transmits a pilot signal having a lowest transmitting power among those pilot signals, if a difference between the lowest measured transmission loss and a second lowest measured transmission loss is not larger than or equal to a prescribed value.

2 Claims, 9 Drawing Sheets

MOBILE TERMINAL

CROSS-REFERENCE TO RELATED APPLICATION

This application is based upon and claims the benefit of priority from Japanese Patent Application No. 2004-178375, filed on Jun. 16, 2004, the entire contents of which are incorporated herein by reference.

BACKGROUND OF THE INVENTION

1. Field of the Invention

The present invention relates to a mobile terminal that accesses, via wireless zones, a mobile communication system in which the wireless zones are formed by a plurality of radio base stations, respectively.

2. Description of the Related Art

In many CDMA (code division multiple access) mobile communication systems, a plurality of wireless zones is formed by sharing a common radio-frequency band through code division multiplexing using different spreading codes.

Figure 8:
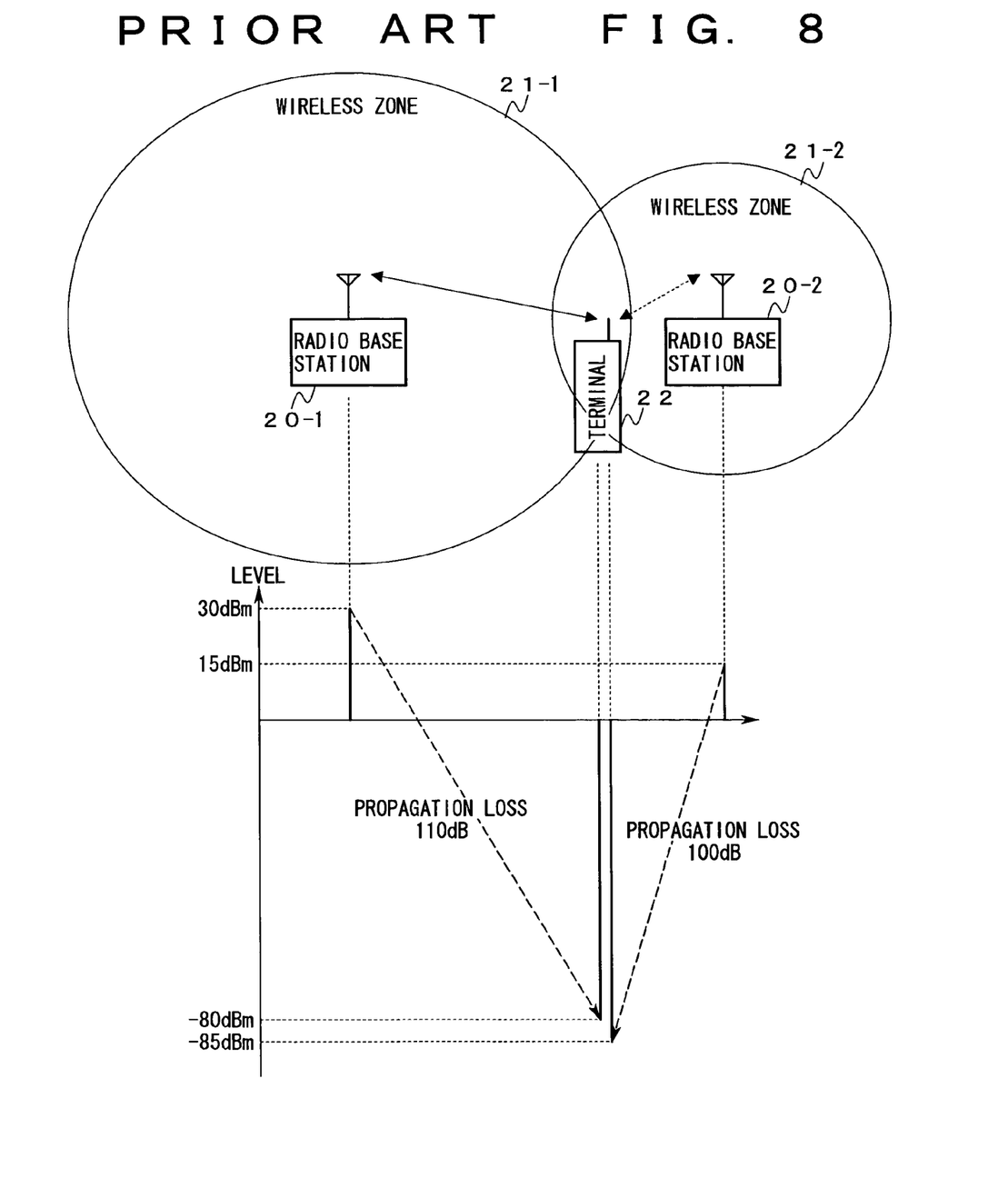
FIG. 8 shows the configuration of an exemplary CDMA mobile communication system.

FIG. 8 shows the configuration of an exemplary CDMA mobile communication system. As shown in FIG. 8, radio base stations 20-1 and 20-2 form respective wireless zones 21-1 and 21-2 and a terminal 22 is located in an overlap area of the wireless zones 21-1 and 21-2.

In the above-configured mobile communication system, the terminal 22 evaluates the transmission quality of each of pilot signals that come from the radio base stations 20-1 and 20-2 and are separated by spread processing performed in itself at the time of a start, disappearance of a preceding call, or entrance into a new wireless zone.

In the following description, it is assumed that the radio base stations 20-1 and 20-2 have pilot signal transmitting power of 30 dBm and 15 dBm, respectively, and pilot signals originating from the radio base stations 20-1 and 20-2 have levels of −80 dBm and −85 dBm, respectively, when they reach the terminal 22.

The terminal 22 accesses a particular radio base station (assumed here to be the radio base station 20-1) that provides a best transmission quality evaluation result via the wireless zone 21-1.

When the terminal 22 is in a state of receiving communication services in the above-mentioned area, it maintains high transmission quality by performing soft handover in which different reception waves coming from the radio base stations 20-1 and 20-2 via traffic channels are combined together.

In the soft handover, at the start of a transmission via a handover destination wireless zone, the terminal 22 employs, for example, transmitting power (called "preset transmitting power") that is employed in current transmissions via the wireless zones 21-1 and 21-2 or the preset transmitting power plus a predetermined constant.

The prior art relating to the present invention includes the following techniques:

Japanese Unexamined Patent Application Publication No. 2001-128215: A TDMA-TDD transmitting/receiving apparatus and transmitting/receiving method characterized in that common control channel signals transmitted from base station apparatus are extracted by despreading, transmission losses are measured for the respective base station apparatus by using reception levels and transmission levels of the common control channel signals, and an individual communication channel signal is sent to a base station apparatus whose measured transmission loss is lowest among all the base station apparatus.

Japanese Unexamined Patent Application Publication No. 2000-201368: A call control method and a related system characterized in that the difference between transmitting power information contained in a pilot signal transmitted from a radio base station that forms each of two adjoining wireless zones and reception electric field intensity that is obtained when the pilot signal is received actually (corresponds to a transmission loss of a path from the radio base station to the terminal) is determined and a call is originated to one of the two radio base stations that forms a wireless zone for which the determined difference is smaller.

Japanese Unexamined Patent Application Publication No. Hei 8-256102: A cellular system having functions of receiving power measurement reference signals that are sent from a plurality of base stations at a predetermined power, detecting transmission losses for the respective base stations on the basis of the power measurement reference signals, and using a communication channel of a base station whose detected transmission loss is lowest when a communication request has occurred in the mobile terminal.

Figure 9:
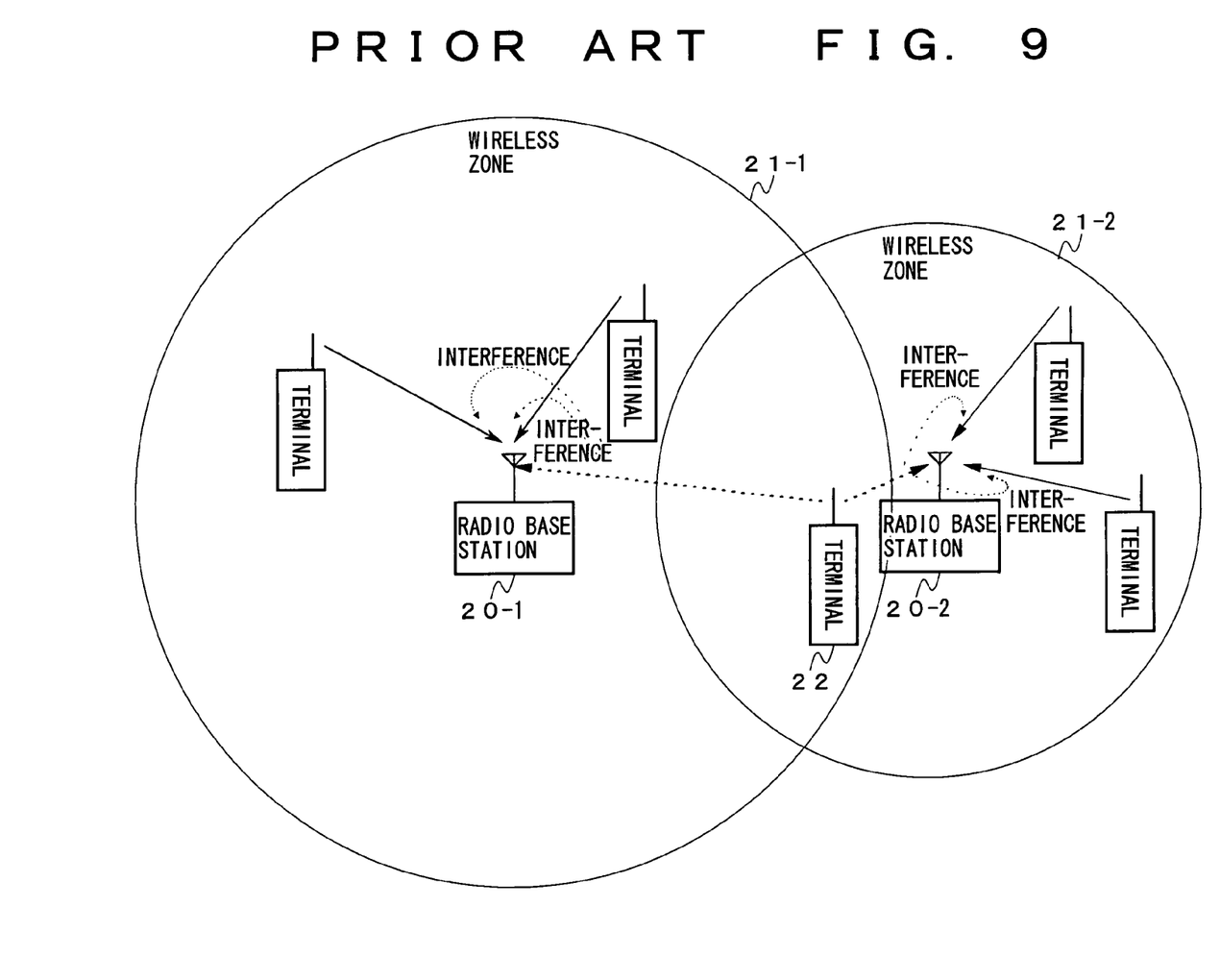
FIG. 9 illustrates a problem of the conventional example.

Incidentally, in the above-described conventional example of FIG. 9, at the time of call origination or handover, the terminal 22 accesses and sends a signal via the wireless zone 21-1 whose transmission quality of the downstream link (from the radio base station 20-1 to the terminal 22) is highest though a radio-frequency signal that the terminal 22 sends at the time of call origination, a termination response, or handover arrives at the radio base stations 20-1 and 20-2 and other radio base stations as interference waves.

Therefore, although the terminal 22 can receive a communication service with high transmission quality via the wireless zone 21-1, it is highly probable that in the radio base station 20-2 the DU ratio of the upstream link lowers to a large extent temporarily after the start of sending of the radio-frequency signal from the terminal 22 because of the interference caused by the radio-frequency signal.

Further, such interference is a factor of reducing the channel capacity (e.g., the number of terminals that can be accommodated) per unit radio frequency. In addition, such interference may be a factor of causing a reduction in transmission quality or a forcible disconnection of a communication channel in another terminal that started to receive a communication service in the wireless zone 21-1 earlier than the terminal 22 does.

SUMMARY OF THE INVENTION

An object of the present invention is to increase the channel capacity and the transmission quality properly within the confines of costs without changing the configuration to a large extent.

Another object of the invention is to enable effective use of resources and enhance the performance and the added value at low cost, in a radio communication system or a radio transmission system to which the invention is applied.

Another object of the invention is to lower the degree of interference between a wireless zone formed by a satellite base station or the like for covering a blind zone and wireless zones formed around the blind zone and to increase the degree of freedom relating to site requirements without causing a large increase in cost.

Still another object of the invention is to reduce the running costs of a radio base station and a terminal on average and to provide a proper measure for preventing both of cost increase and increase in the degrees of interference and disturbance.

Another object of the invention is to save the power consumption, lower the degree of interference with a mobile communication network, and increase the number of terminals and the amount of traffic that can be accommodated by each wireless zone.

Yet another object of the invention is to use radio resources including radio frequencies effectively and to improve the total transmission quality and service quality.

A further object of the invention is to use radio resources including radio frequencies more effectively than in a third aspect of the invention and to improve the total transmission quality and service quality.

The invention is summarized as follows.

According to a first aspect of the invention, a measuring section measures a downstream transmission loss using a pilot signal that is transmitted from each radio base station. When the difference between a lowest measured transmission loss and a second lowest measured transmission loss is not larger than or equal to a prescribed value, a selecting section compares transmitting power of a pilot signal corresponding to a lowest measured transmission loss with transmitting power of pilot signals for each of which the difference between a corresponding measured transmission loss and the lowest measured transmission loss is smaller than a prescribed value, and the selecting section selects, as an origination destination or handover destination, a radio base station that transmits a pilot signal having a lowest transmitting power among those pilot signals.

If the differences between the lowest measured transmission loss and the other measured transmission losses are smaller than the prescribed value, marked reduction is not necessarily attained in interference or disturbance even if the radio base station corresponding to the lowest measured transmission loss is determined as an origination destination or handover destination.

In such a case, a radio base station corresponding to the lowest one of pilot signal transmitting powers of radio base stations for which the difference between the measured transmission loss and the lowest measured transmission loss is smaller than the prescribed value is determined as an origination destination or handover destination. Therefore, in general, the transmitting power values of the upstream link and the downstream link of radio channels that are assigned to the mobile terminal are set small on average.

According to a second aspect of the invention, a first measuring section measures a reception level of a pilot signal that is transmitted from each radio base station. A second measuring section measures a downstream transmission loss using the pilot signal. A base station selecting section selects a radio base station that transmits a pilot signal corresponding to a highest reception level as a downstream signal transmission base station on the basis of measurement results of the first measuring section, and selects a radio base station that transmits a pilot signal corresponding to a lowest transmission loss as an upstream signal reception base station on the basis of measurement results of the second measuring section.

In the mobile terminal according to this aspect of the invention, a transition is made to a call-waiting state with a wireless zone via which a pilot signal has been received at a highest level. On the other hand, an upstream signal is transmitted to a radio base station that forms a wireless zone corresponding to a lowest downstream transmission loss.

According to a third aspect of the invention, a measuring section measures a downstream transmission loss using a pilot signal that is transmitted from each radio base station. A selecting section determines transmitting power of a particular pilot signal corresponding to a lowest measured transmission loss and transmitting power of pilot signals for each of which a difference between a corresponding measured transmission loss and the lowest measured transmission loss is smaller than a prescribed value. The selecting section selects, as an origination destination or handover destination, a radio base station that transmits a pilot signal corresponding to a low measured transmission loss among those pilot signals for each of which a ratio of a relative transmission loss with respect to the lowest measured transmission loss to a relative transmitting power with respect to the transmitting power of the particular pilot signal is larger than a predetermined threshold value.

The threshold value means a ratio of allocation of interference amounts to an upstream link and a downstream link, and can be determined in advance as a theoretical value used in a process of system designing or a value that conforms to results of a simulation or a field test.

That is, a wireless zone via which access is made by the mobile terminal according to the invention is set to a wireless zone that attains a desired ratio of the allocation of interference amounts to an upstream link and a downstream link and that makes the transmission loss of the downstream link as low as possible.

According to a fourth aspect of the invention, a measuring section measures a downstream transmission loss using a pilot signal that is transmitted from each radio base station. A selecting section determines transmitting power of a particular pilot signal corresponding to a lowest measured transmission loss and transmitting power of pilot signals for each of which a difference between a corresponding measured transmission loss and the lowest measured transmission loss is smaller than a prescribed value. The selecting section selects, as an origination destination or handover destination, a radio base station that transmits a pilot signal corresponding to a low measured transmission loss among those pilot signals for each of which a ratio of a relative transmission loss with respect to the lowest measured transmission loss to a relative transmitting power with respect to the transmitting power of the particular pilot signal is larger than a predetermined threshold value. The radio base station being able to secure transmitting power that is desired to be applied to a downstream link of a traffic channel in accordance with the measured transmission loss within the confines of remaining resources.

A wireless zone via which access is made by the mobile terminal according to the invention is set to a wireless zone that attains a desired ratio of the allocation of interference amounts to an upstream link and a downstream link as in the case of the third aspect of the invention, and that is low in the probability that the service quality lowers due to shortage of the above-mentioned resources.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Embodiments of the present invention will be hereinafter described in detail with reference to the drawings.

Figure 1:
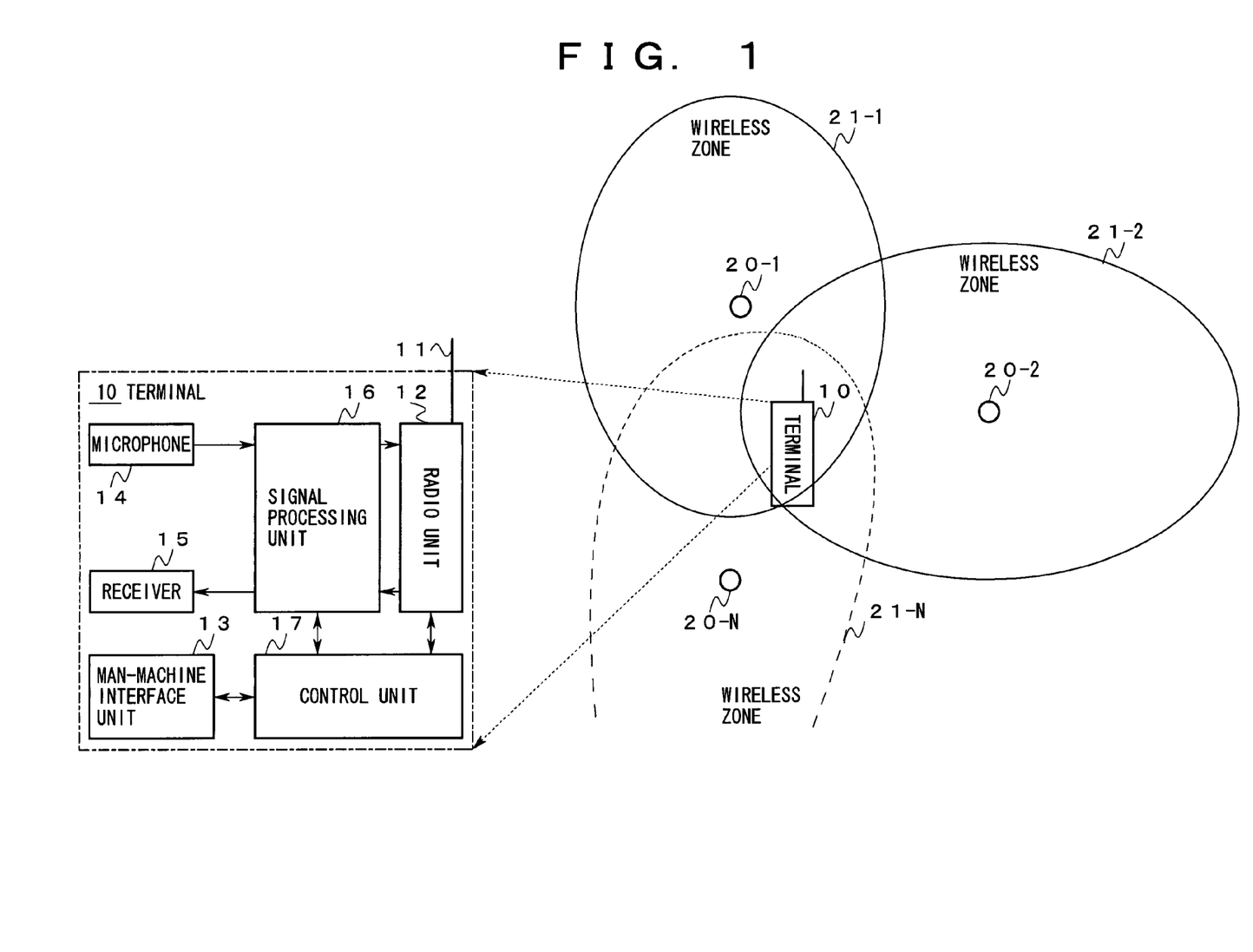
FIG. 1 shows first to fourth embodiments of the present invention.

FIG. 1 shows first to fourth embodiments of the invention. As shown in FIG. 1, a terminal 1 is located in an overlap area of wireless zones 21-1 and 21-2 that are formed by different radio base stations 20-1 and 20-2, respectively, and is composed of the following components:

Antenna 11

Radio unit 12 connected to the feeding point of the antenna 11.

Man-machine interface unit 13

Microphone 14

Receiver 15

Signal processing unit 16 connected to the microphone 14, the receiver 15, and a modulation/demodulation terminal of the radio unit 12.

Control unit 17 having input/output ports or bus terminals that are connected to control terminals of the man-machine interface unit 13, the signal processing unit 16, and the radio unit 12, respectively.

Figure 2:
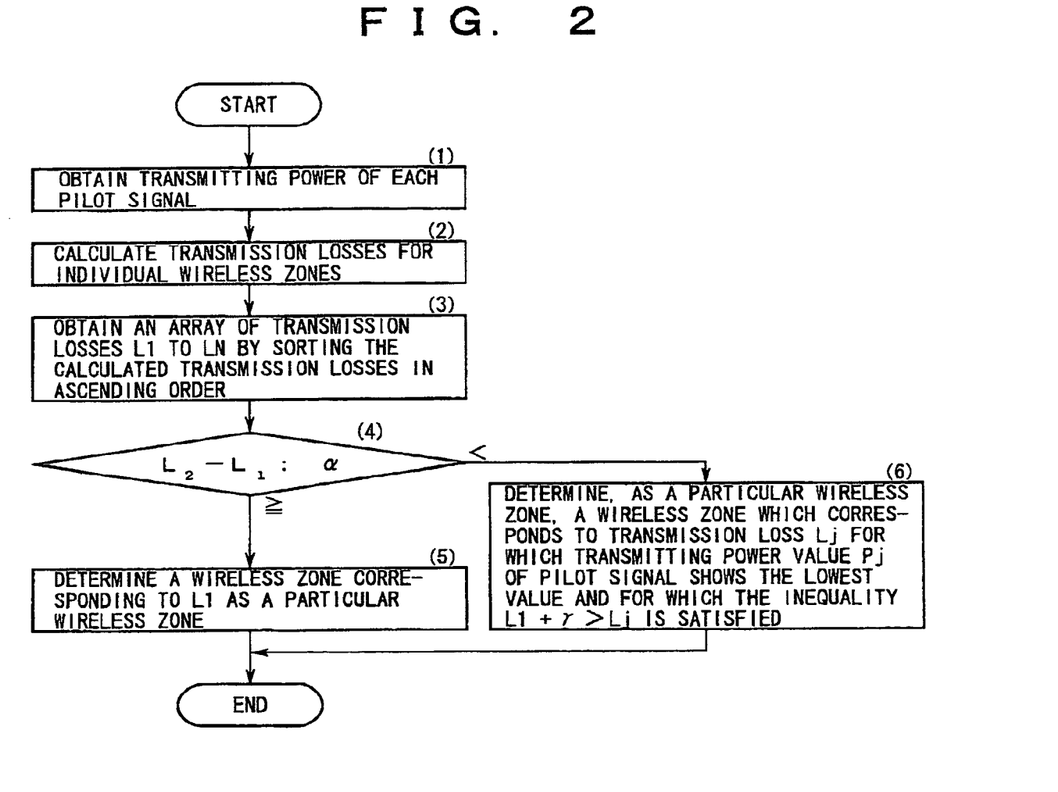
FIG. 2 is a flowchart showing the operation of the first embodiment of the invention.
Figure 3:
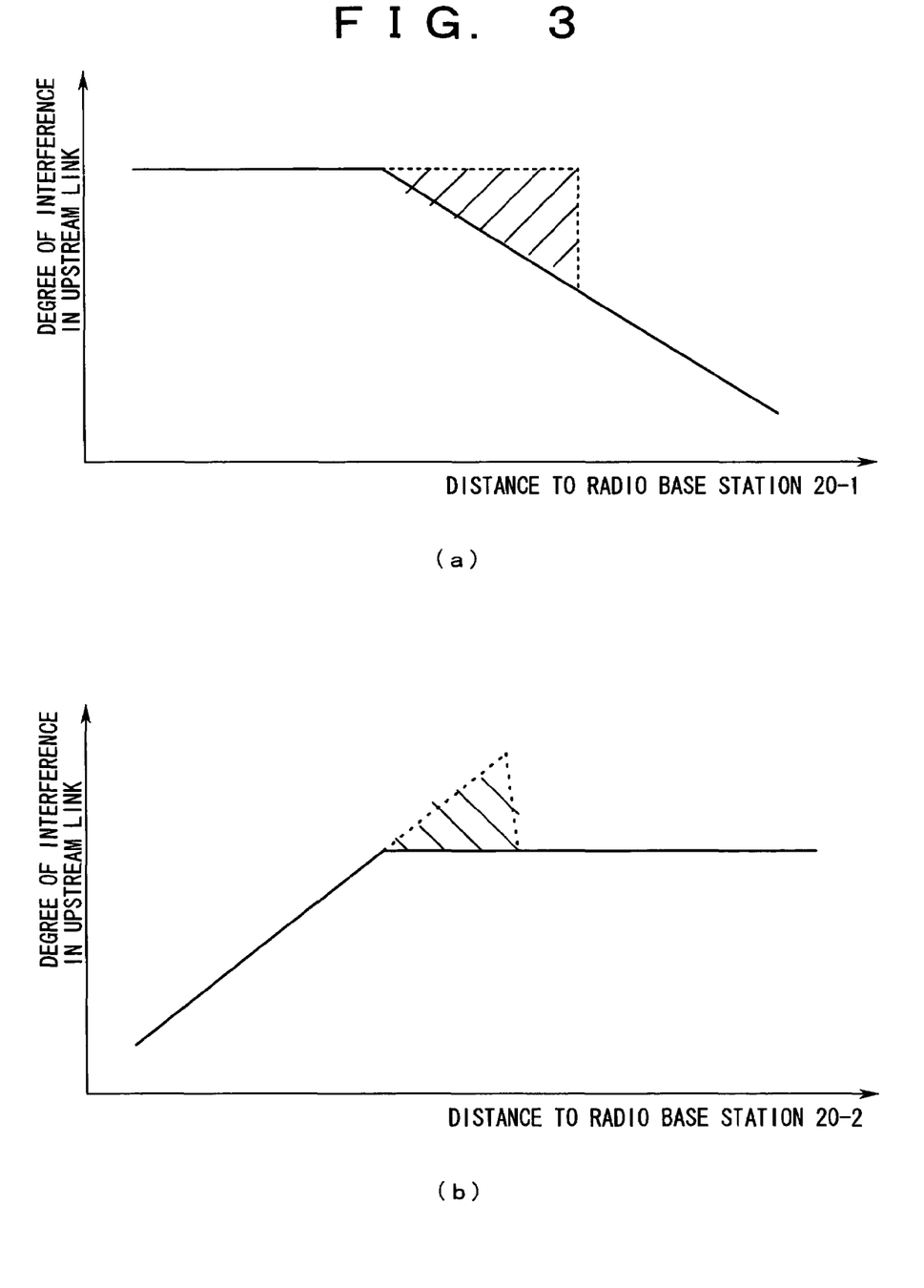
FIGS. 3A and 3B show the degree of interference that is suppressed in the first embodiment of the invention.

FIG. 2 is a flowchart showing the operation of the first embodiment of the invention. FIGS. 3A and 3B show the degree of interference that is suppressed in the first embodiment of the invention.

[First Embodiment]

The operation of the first embodiment of the invention will be hereinafter described with reference to FIG. 1 to FIGS. 3A and 3B, starting from basic operations of the individual units of the terminal 10.

The control unit 17 realizes the following basic functions of the terminal 10 by unifying operations of the man-machine interface unit 13 that is used for manipulation display for call origination, call termination, etc., the signal processing unit 16 for performing, in the baseband domain, signal processing that is suitable for a modulation/demodulation scheme, a multiple access scheme, and a channel configuration, and the radio unit 12 for performing radio interfacing that is suitable for frequency allocation and a zone configuration and thereby attaining organic cooperation between the man-machine interface unit 13, the signal processing unit 16, and the radio unit 12.

(Start)

Determines a wireless zone (hereinafter referred to as "particular wireless zone") via which its own station (terminal 10) is to access a radio base station at the time of call origination or a response to paging.

(Call Origination)

Cooperates with the signal processing unit 16 and the radio unit 12 in response to an origination request from the man-machine interface unit 13 to exchange, with the cooperating radio base station via the above-mentioned particular wireless zone, signals relating to a channel control of the origination call concerned and identifies those signals.

Determines a wireless zone via which the terminal 10 originates a call and a radio channel to be used for a communication service according to the above channel control procedure.

Further, for example, if such an origination call is a telephonic one, causes the signal processing unit 16 and the radio unit 12 to generate a speech signal or restore a voice via the microphone 14 and the receiver 15 and to perform processing that relates to radio transmission.

(Call Termination)

Analyzes a ringing signal that arrives via the particular wireless zone under the above-described channel control and is received in cooperation with the radio unit 12 and the signal processing unit 16.

If the ringing signal is for paging of the terminal 10, cooperates with the radio unit 12, the signal processing unit 16, and the man-machine interface unit 13 according to a predetermined channel control procedure to generate ringing tones and make a termination display.

Sends a termination response to the radio base station via the signal processing unit 16 and the radio unit 12 in response to an instruction from a user and realizes exchange of speech signals via the microphone 14 and the receiver 15 as in the case of the above-described call origination.

This embodiment is characterized in a process that is executed by the control unit 17 to determine a particular wireless zone.

The signal processing unit 16 measures levels $p_1$ to $p_N$ (assumed here to be Ec/Io or Ec) of pilot signals that come from the radio base stations 20-1 and 20-2 and other radio base stations (these radio base stations will be hereinafter referred to as "a plural number N ($\geq 2$) of radio base stations"), respectively, and are received through cooperation with the radio unit 12 under the control of the control unit 17, and sequentially delivers the levels $p_1$ to $p_N$ and the pilot signals to the control unit 17.

The control unit 17 performs the following processing:

Individually analyzes the thus-delivered pilot signals, thereby sequentially obtaining transmitting power values $P_1$ to $P_N$ (all of which are assumed here to be information that is added to the pilot signals by the radio base stations as the transmitting ends) of the pilot signals (step (1) in FIG. 2).

Individually calculates transmission losses $L_i$ according to the following Equation (1) for the plural number N of radio base stations (step (2) in FIG. 2):

$$L_i = P_i - p_i (1 \leq i \leq N) \tag{1}$$

Obtains a sequence of transmission losses $L_j$ ($1 \leq j \leq n$) by sorting the calculated transmission losses $L_1$ to $L_N$ in ascending order (step (3) in FIG. 2).

Judges whether the following Inequality (2) is satisfied for a predetermined threshold value $\alpha$ (>0) (step (4) in FIG. 2). If Inequality (2) is satisfied, determines, as a particular wireless zone, a wireless zone corresponding to the minimum calculated transmission loss $L_1$ ($=L_j(j=1)$) among the wireless zones 21-1 to 21-N that are formed by the plural number N of radio base stations, respectively (step (5) in FIG. 2).

$$L_2 - L_1 \geq \alpha \tag{2}$$

If Inequality (2) is not satisfied, determines, as a particular wireless zone, among the wireless zones 21-1 to 21-N, a wireless zone corresponding to the lowest one of transmitting power values $P_j$ of wireless zones for which the calculated transmission loss $L_j$ satisfies the following Inequality (3) for the minimum transmission loss $L_1$ and a threshold value $\gamma$ (>0) (step (6) in FIG. 2). The threshold value $\gamma$ need not be equal to the above-mentioned threshold value $\alpha$ and may be different from it.

$$L_1 + \gamma > L_j \qquad (3)$$

The threshold value $\alpha$ means a minimum difference between transmission losses that is desired to be secured between any different ones of the wireless zones 21-1 to 21-N, and can be determined in advance as a theoretical value used in a process of system designing or a value that conforms to results of a simulation or a field test.

That is, if the differences between the minimum transmission loss $L_1$ and the other transmission losses $L_2$ to $L_n$ of the transmission losses $L_1$ to $L_n$ ($1 \leq i \leq n$) is higher than or equal to $\alpha$, a wireless zone corresponding to the minimum calculated transmission loss $L_1$ among the wireless zones 21-1 to 21-N is determined as a particular wireless zone.

This prevents an event that a wireless zone for which the transmitting power of a pilot signal sent from the corresponding radio base station is high is given a high priority in selecting a particular wireless zone among the wireless zones 21-1 to 21-N, and reduces the difference in transmission quality between an upstream link and a downstream link.

The above measure also prevents an event that the transmitting power of a radio-frequency signal sent from the terminal 10 is set unduly high as well as increase in the degree of interference with an upstream link caused by the radio-frequency signal in each of the wireless zones 21-1 to 21-N (indicated by thick solid lines in FIGS. 3A and 3B in comparison with a conventional case (broken lines)). Further, the above measure increases the completion ratio of calls occurring at the terminal 10 and improves the service quality.

However, there may occur a case that the differences between the minimum transmission loss $L_1$ and the other transmission losses $L_2$ to $L_n$ is lower than the threshold value $\alpha$ and hence marked reduction may not be attained in interference or disturbance even if the wireless zone corresponding to the minimum transmission loss $L_1$ is determined as a particular wireless zone. In such a case, a wireless zone corresponding to the lowest one of pilot signal transmitting power values of part of the wireless zones 21-1 to 21-N for which the difference between the calculated transmission loss and the minimum transmission loss $L_1$ is smaller than the threshold value $\alpha$ is determined as a particular wireless zone.

Therefore, the transmitting power values of the upstream link and the downstream link of a traffic channel and other radio channels that are assigned to the terminal 10 are set small on average, whereby the running costs of the radio base stations 20-1 to 20-N and the terminal 10 are reduced on average.

As described above, this embodiment provides a proper measure for preventing both of cost increase and increase in the degrees of interference and disturbance in accordance with the threshold value $\alpha$.

In this embodiment, the processing of determining a particular wireless zone is made efficient by sorting the transmission losses $L_1$ to $L_N$ in ascending order. However, for example, where increase in throughput and reduction in response speed are permitted, the sorting may be omitted. That is, the minimum transmission loss $L_j$ may be searched for after performing necessary processing on all the transmission losses $L_1$ to $L_N$, respectively.

[Second Embodiment]

Figure 4:
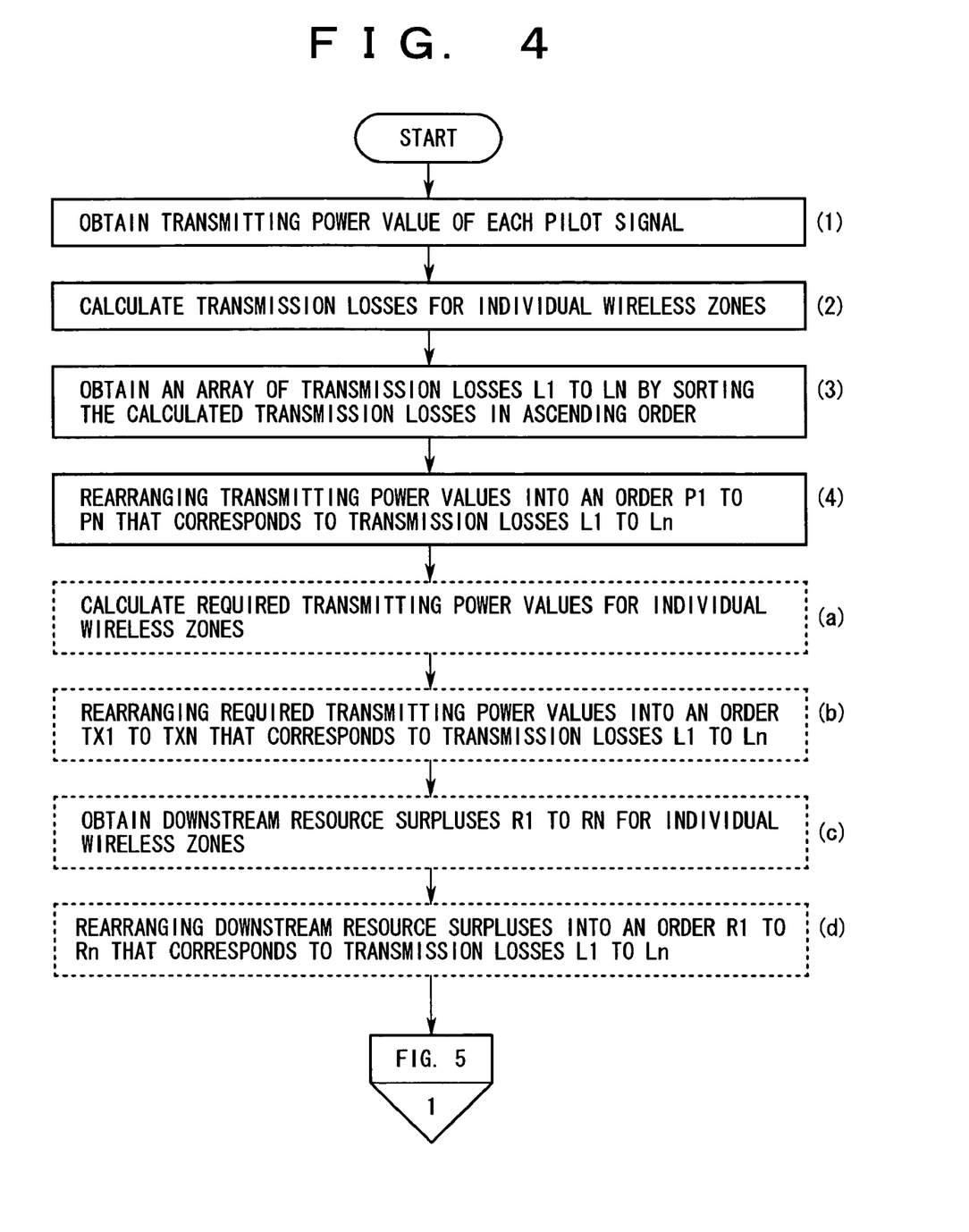
FIGS. 4 and 5 are flowcharts showing the operations of second and third embodiments of the invention.
Figure 5:
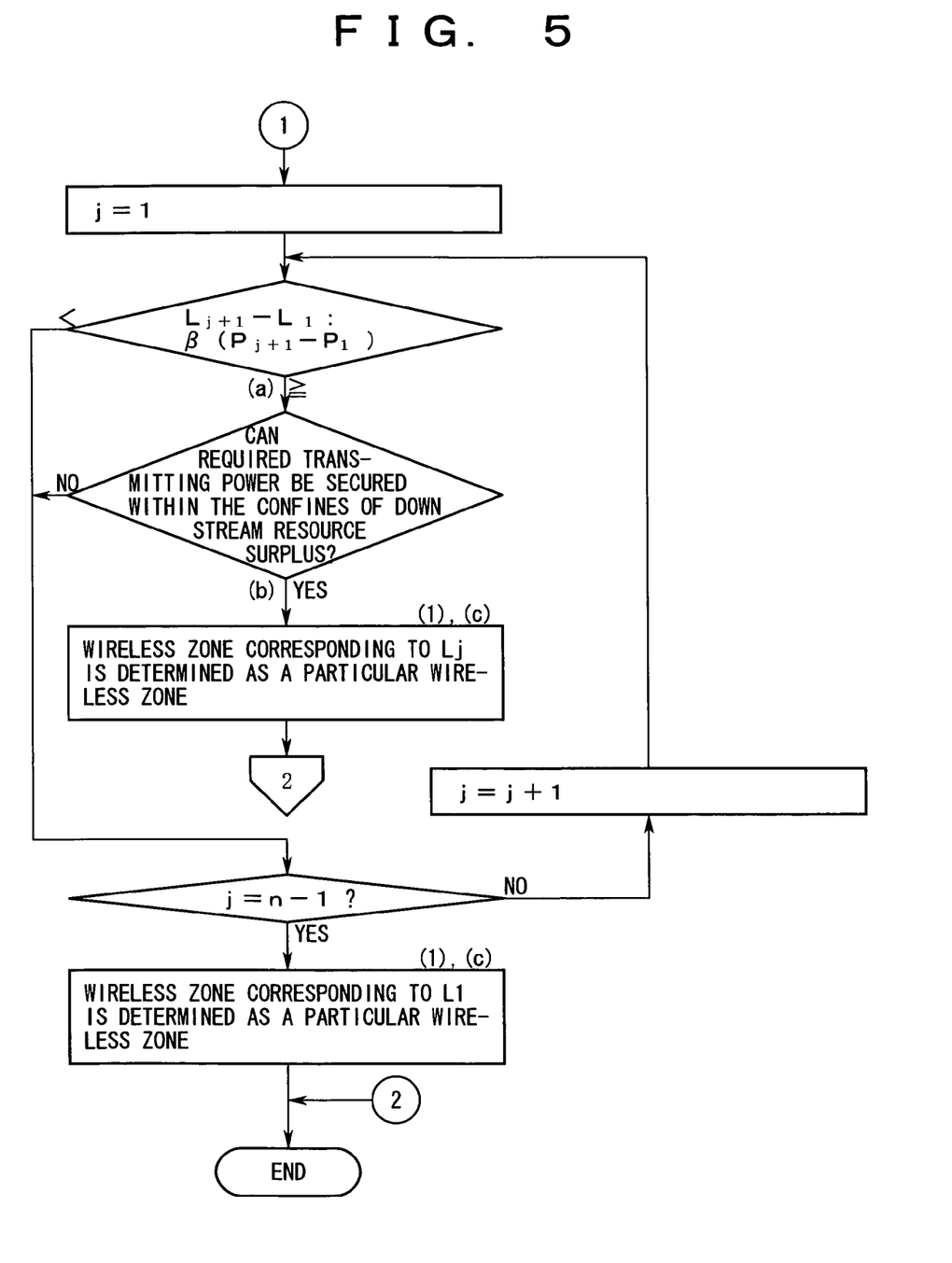

FIGS. 4 and 5 are flowcharts showing the operations of second and third embodiments of the invention. The operation of the second embodiment of the invention will be described below with reference to FIGS. 1, 4, and 5.

This embodiment is characterized in a process that is executed by the control unit 17 to determine a particular wireless zone.

As in the case of the first embodiment, the signal processing unit 16 measures levels $p_1$ to $p_N$ of pilot signals that come from a plural number N ($\geq 2$) of radio base stations, respectively, and are received through cooperation with the radio unit 12 under the control of the control unit 17, and sequentially delivers the levels $p_1$ to $p_N$ and the pilot signals to the control unit 17.

The control unit 17 performs the following processing:

Individually analyzes the thus-delivered pilot signals, thereby sequentially obtaining transmitting power values $P_1$ to $P_N$ (all of which are assumed here to be information that is added to the pilot signals by the radio base stations as the transmitting ends) of the pilot signals (step (1) in FIG. 4).

Individually calculates transmission losses $L_i$ according to the above-mentioned Equation (1) for the plural number N of radio base stations (step (2) in FIG. 4), and obtains a sequence of transmission losses $L_j$ ($1 \leq j \leq n$) by sorting the calculated transmission losses $L_1$ to $L_N$ in ascending order (step (3) in FIG. 4).

Rearranging the transmitting power values $P_1$ to $P_N$ into transmitting power values $P_j$ ($1 \leq j \leq n$) that correspond to the respective transmission losses $L_1$ to $L_n$ (step (4) in FIG. 4).

Determines, as a particular wireless zone, among the wireless zones 21-1 to 21-N that are formed by the plural number N of radio base stations, respectively, a wireless zone corresponding to a lowest transmission loss $L_j$ among transmission losses that satisfy the following Inequality (4) for a predetermined coefficient $\beta$ (step (1) in FIG. 5). If none of the transmission losses $L_1$ to $L_n$ satisfy Inequality (4), the wireless zone corresponding to the minimum transmission loss $L_1$ is determined as a particular wireless zone.

$$L_j + 1 - L_1 \geq \beta (P_j + 1 - P_1) \qquad (4)$$

The coefficient $\beta$ means a ratio of allocation of interference amounts to an upstream link and a downstream link, and can be determined in advance as a theoretical value used in a process of system designing or a value that conforms to results of a simulation or a field test.

That is, a particular wireless zone is selected as a wireless zone that attains a desired ratio of the above-mentioned allocation of interference amounts and that makes the transmission loss of a downstream link as low as possible.

Therefore, this embodiment makes it possible to use radio resources including radio frequencies more effectively than in the first embodiment and improves the total transmission quality and service quality.

In this embodiment, the processing of determining a particular wireless zone is made efficient by sorting the transmission losses $L_1$ to $L_N$ in ascending order early. However, for example, where increase in throughput and reduction in response speed are permitted, the sorting may be omitted.

That is, a minimum transmission loss $L_j$ may be searched for after performing necessary processing on all the transmission losses $L_1$ to $L_N$, respectively.

[Third Embodiment]

The operation of the third embodiment of the invention will be described below with reference to FIGS. 1, 4, and 5.

This embodiment is characterized in that a particular wireless zone is determined by the control unit 17 according to the following procedure:

As in the case of the second embodiment, sequentially obtains transmitting power values $P_1$ to $P_N$ of pilot signals (step (1) in FIG. 4), individually calculates transmission losses $L_i$ according to the above-mentioned Equation (1) for a plural number N of radio base stations (step (2) in FIG. 4), and obtains a sequence of transmission losses $L_j$ ($1 \leq j \leq n$) by sorting the calculated transmission losses $L_1$ to $L_N$ in ascending order (step (3) in FIG. 4).

Rearranging the transmitting power $P_1$ to $P_N$ into transmitting power values $P_j$ ($1 \leq j \leq n$) that correspond to the respective transmission losses $L_1$ to $L_n$ (step (4) in FIG. 4).

Calculates transmitting power values (hereinafter referred to as "required transmitting power values") $TX_1$ to $TX_N$ that are desired to be used for the downstream links of traffic channels by individually performing, for example, an arithmetic operation to be described later for the plural number N of wireless zones (step (a) in FIG. 4).

Rearranging the required transmitting power values $TX_1$ to $TX_N$ into transmitting power values $TX_j$ ($1 \leq j \leq n$) that correspond to the respective transmission losses $L_1$ to $L_n$ (step (b) in FIG. 4).

Obtains, for the plurality of wireless zones, surpluses (hereinafter referred to as "downstream resource surpluses") $R_1$ to $R_N$ of the radio resources of downstream links that are communicated individually from the radio base stations as broadcast information (step (c) in FIG. 4).

Rearranging the downstream resource surpluses $R_1$ to $R_N$ into surpluses $R_j$ ($1 \leq j \leq n$) that correspond to the respective transmission losses $L_1$ to $L_n$ (step (d) in FIG. 4).

At step (c) in FIG. 5, determines, as a particular wireless zone, among the wireless zones 21-1 to 21-N that are formed by the plural number N of radio base stations, respectively, a wireless zone corresponding to a lowest transmission loss $L_j$ among transmission losses that satisfy the above-mentioned Inequality (4) for the predetermined coefficient β (step (a) in FIG. 5) and allow the corresponding required transmitting power value to be secured within the confines of the downstream resource surplus (step (b) in FIG. 5). If none of the transmission losses $L_1$ to $L_n$ satisfy Inequality (4), the wireless zone corresponding to the minimum transmission loss $L_1$ is determined as a particular wireless zone (step (c) in FIG. 5).

The above-mentioned required transmitting power $TX_i$ is a result of the arithmetic operation of the following Equation (6) that includes the following parameters:

Transmitting power $TX_{pilot, i}$ of a pilot signal that is sent from the corresponding radio base station.

Level $RSCP_{pilot, i}$ of the pilot signal received by the terminal 10.

Power $I_{0i}$ of interference waves received being superimposed on the pilot signal.

Signal to interference ratio $SIR_i$ of a downstream link that is desired to be secured in the terminal 10.

Processing gain (=SF/2)

Margin C that is desired to be secured in advance.

$$TX_i = TX_{pilot, i} \cdot I_{0i} / \{RSCP_{pilot, i} \cdot SIR_i \cdot (SF/2) \cdot C\} \quad (6)$$

That is, in this embodiment, a particular wireless zone is selected as a wireless zone that attains a desired ratio of allocation of interference amounts to an upstream link and a downstream link and makes the transmission loss of a downstream link as low as possible as in the case of the second embodiment, and that decreases the probability of occurrence of an event that a call occurring at the terminal 10 becomes an incomplete call or the quality of a service provided to the terminal 10 is lowered due to an insufficient downstream resource surplus mentioned above.

Therefore, this embodiment makes it possible to use the radio resources such as radio frequencies more effectively than in the second embodiment and improves the total transmission quality and service quality.

In this embodiment, the above-mentioned downstream resource surpluses $R_1$ to $R_N$ are communicated as broadcast information from the radio base stations for the respective wireless zones. Alternatively, for example, downstream resource surpluses $R_1$ to $R_N$ may be determined by the following distributed processing that is performed by the terminal 10 in cooperation with the radio base stations and a base station controlling station:

The terminal apparatus 10 communicates, for the respective wireless zones, the calculated required transmitting power values to the radio base stations via predetermined radio channels.

The radio base stations (base station controlling station) judge whether the downstream resource surpluses are sufficient for the required transmitting power values, and inform the terminal 10 of judgment results.

The terminal 10 selects candidates for a particular wireless zone on the basis of the judgment results.

In the process of the above distributed processing, the following items may be set in any manner if downstream resource surpluses can be determined with desired accuracy for all the wireless zones:

Radio channels used.

Combination of the radio base stations and the base station controlling station to cooperate with.

Procedure of the cooperation.

Details and forms of information that is delivered mutually in the process of the cooperation.

In the first to third embodiments, priority is given to a wireless zone for which the transmission loss of a downstream link is low. However, in the invention, in selecting a particular wireless zone, priority may be given to, for example, a wireless zone for which the above-mentioned required transmitting power is low instead of a wireless zone for which the transmission loss of a downstream link is low.

In the first to third embodiments, the invention is used for selecting a particular wireless zone as a wireless zone via which the terminal 10 originates a call or waits for a termination call. However, the application field of the invention is not limited to such a case and the invention can also be applied to a case that the terminal 10 selects a particular wireless zone that serves as all or part of the following wireless zones:

Wireless zone for access at the time of call origination.

Wireless zone for access at the time of a response to paging.

Wireless zone as a handover destination or a candidate therefor.

[Fourth Embodiment]

Figure 6:
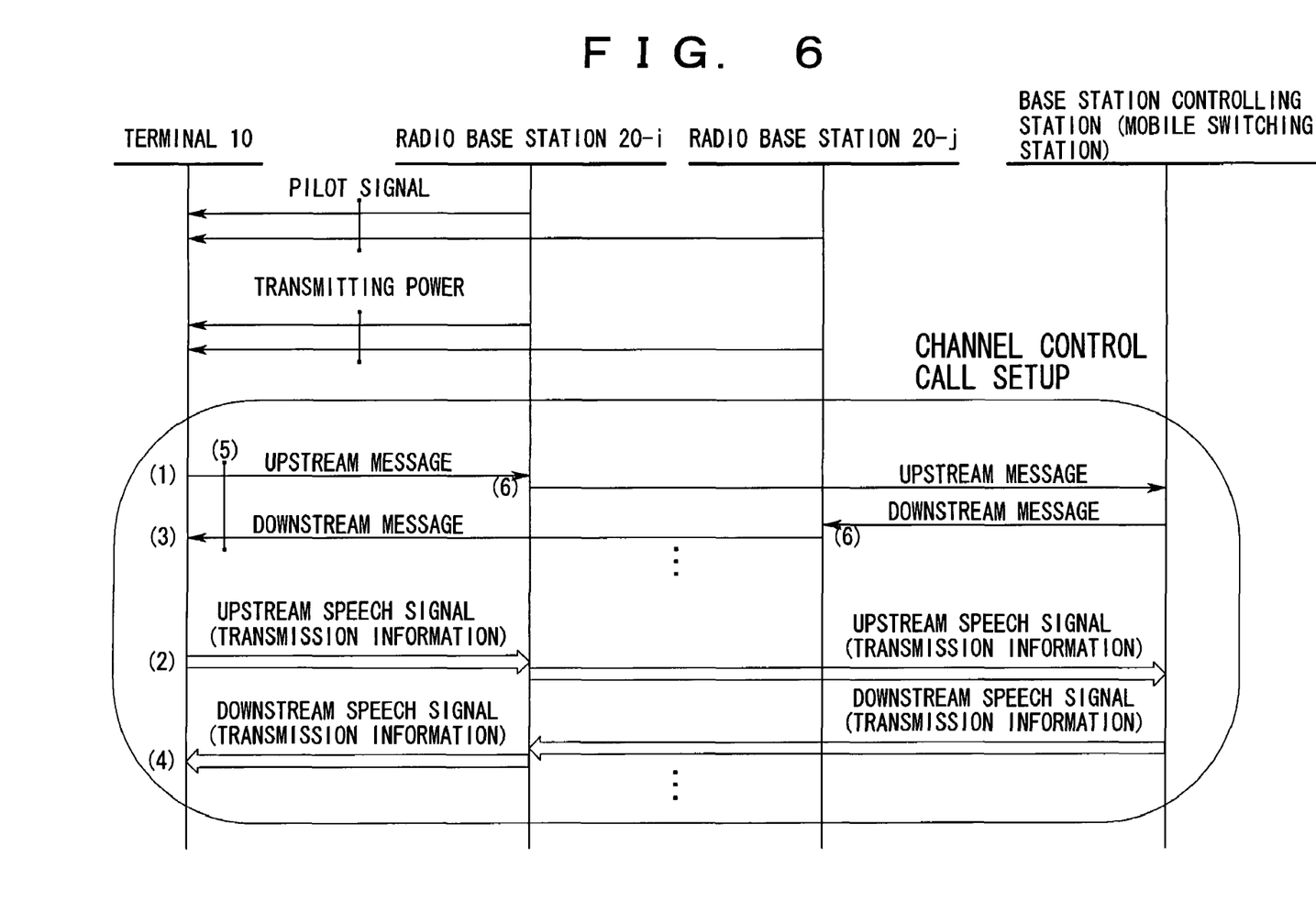
FIG. 6 is a diagram showing the operation of a fourth embodiment of the invention.

FIG. 6 is a diagram showing the operation of a fourth embodiment of the invention. The operation of a fourth embodiment of the invention will be described below with reference to FIGS. 1 and 6.

This embodiment is characterized in a process that is executed by the control unit 17.

As in the case of the first to third embodiments, the signal processing unit 16 measures levels $p_1$ to $p_N$ of pilot signals that come from a plural number N of radio base stations, respectively, and are received through cooperation with the radio unit 12 under the control of the control unit 17, and sequentially delivers the levels $p_1$ to $p_N$ and the pilot signals to the control unit 17.

The control unit 17 determines a particular wireless zone by performing the same processing as in one of the first to third embodiments.

However, in a process of any of call origination, call termination, and handover involving its own station (terminal 10), the control unit 17 uses the particular wireless zone only as an upstream link (indicated by symbols (1) and (2) in FIG. 6). And the control unit 17 uses, as a downstream link, a wireless zone that is formed by a radio base station for which the level $RSCP_{pilot,\ i}$ (or transmission quality) of a received pilot signal is highest among the plural number N of radio base stations (indicated by symbols (3) and (4) in FIG. 6).

Further, even if an upstream link and a downstream link are formed in two different wireless zones in a process of call origination, call termination, or handover involving the terminal 10, to enable cooperation between the radio base stations that form those respective wireless zones, the control unit 17 performs such operations as delivery of information that is necessary for proper execution of channel control and call setting by performing processing similar to processing that is performed in a process of a transition to the other wireless zone according to a procedure of handover between those wireless zones (indicated by symbol (5) in FIG. 6).

The radio base stations that form the above two respective wireless zones operate to attain the above-mentioned channel control and call setting smoothly by cooperating with each other under the control of one or both of a base station controlling station above those radio base stations in rank and a mobile switch according to the above operations of the control unit 17 (terminal 10) (indicated by symbol (6) in FIG. 6).

For example, where neither reduction in service quality due to increase in the throughput of the mobile switch nor formation of an upstream link and a downstream link in wireless zones that are formed under different base station controlling stations is not permitted, channel control and call setting are performed by the control unit 17's forming both of an upstream link and a downstream link in a particular wireless zone.

That is, in the terminal 10, the required transmitting power of a transmission via an upstream link is suppressed to a minimum value as indicated by Equation (6).

Therefore, according to this embodiment, as the required transmitting power is set smaller, the power consumption of the terminal 10 is decreased, the degree of interference with the mobile communication network is lowered, and the number of terminals and the amount of traffic that can be accommodated by each wireless zone are increased from those of the first to third embodiments.

The fourth embodiment does not refer to detailed procedures of channel control and call setting that are performed through cooperation between the terminal 10 and the radio base stations under the base station controlling station or the mobile switch. However, the channel control and call setting procedures and the details and the forms of information that is exchanged between the terminal 10 and the radio base stations etc. in processes of the channel control and the call setting may be anything as long as it is compatible with the zone configuration, channel configuration, frequency allocation, multiple access scheme, modulation/demodulation method, etc. of a mobile communication system to which the invention is applied.

Figure 7:
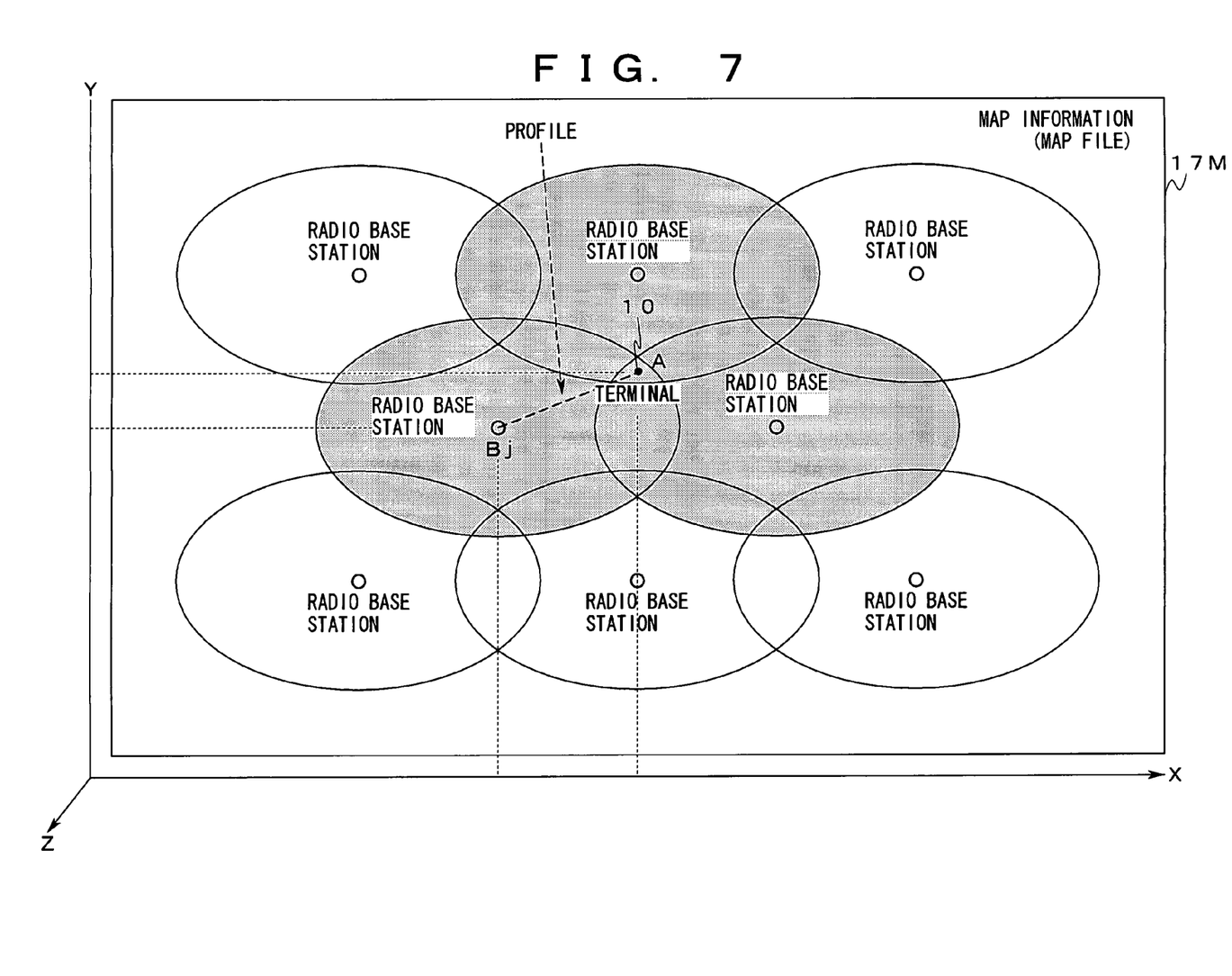
FIG. 7 shows the structure of map information.

In each of the above embodiments, a transmission loss $L_i$ is calculated according to the above-mentioned Equation (1) as the difference between transmitting power $P_i$ of a pilot signal transmitted from a radio base station and a level $p_i$ of the pilot signal as received actually by the terminal 10. Alternatively, for example, a transmission loss $L_i$ may be determined by using a positioning system in the following manner:

- As shown in FIG. 7, map information (map file) 17M indicating a distribution of wireless zones to be used for providing communication services to the terminal 10 as well as a distribution of landforms and features that correspond to sets of coordinates indicating geometrical three-dimensional positions in all regions including the positions of radio base stations forming those wireless zones is stored in advance in the main memory of the control unit 17.
- The control unit 17 determines a position A of its own station (terminal 10) by utilizing the GPS (global positioning system), for example, and determines a position $B_j$ of a desired radio base station independently or by cooperating with that radio base station.
- The control unit 17 obtains a profile of landforms and features along a radio transmission channel that is formed between the positions A and $B_j$ on the map information 17M, and determines a transmission loss $L_i$ of the radio transmission channel by simulating or estimating a transmission model of the radio transmission channel on the basis of the profile.

The method for determining the positions A and $B_j$ is not limited to the method of using the GPS, and all or part of the positions A and $B_j$ may be determined by using one of a variety of radio navigation methods and self-contained navigation methods.

In each of the above embodiments, the invention is applied to the CDMA mobile communication system. However, the application field of the invention is not limited to the CDMA mobile communication system, and the invention can be applied to radio communication systems and radio transmission systems using the spread spectrum communication where interference of the above-described kind may occur, irrespective of the multiple access scheme, zone configuration, frequency allocation, channel configuration, etc.

In each of the above embodiments, a particular wireless zone is selected by processing that is performed by the terminal 10 (control unit 17) while almost no alterations are made to the functions of all or part of the radio base stations, the base station controlling station, and the mobile switch. Alternatively, such processing may be realized as various kinds of distributed processing through cooperation between the terminal 10 and the radio base stations etc. that exchange information with the terminal 10 via radio transmission channels.

In each of the above embodiments, no transmitting power control is performed on the upstream link or the downstream link. However, the invention can also be applied to a case that such a transmitting power control is performed.

In each of the above embodiments, all wireless zones as candidates for a particular wireless zone are determined and values of common items are sequentially determined together for each set of wireless zones. However, the invention is not limited to such a configuration. For example, processing equivalent to the above processing may be performed in such a manner that every time a wireless zone as a candidate for a particular wireless zone is determined values of all items relating to that wireless zone are determined together.

In each of the above embodiments, priority is given to a wireless zone for which the transmission loss of a downstream link is low in selecting a particular wireless zone. However, the invention is not limited to such a configuration. For example, instead of the transmission loss of a downstream link, the required transmitting power may be used that is set, in general, at a smaller value as the transmission loss decreases and is applied to a transmission to an upstream link.

Further, such a required transmitting power need not always be determined by an arithmetic operation including the transmission loss or as a conversion value of the transmission loss. For example, such a required transmitting power may be given on the basis of known site requirements and office data.

The invention is not limited to the above embodiments and various modifications may be made without departing from the spirit and scope of the invention. Any improvement may be made in part or all of the components.

What is claimed is:

1. A mobile terminal which is used in a mobile communication system in which a plurality of wireless zones is formed by a plurality of radio base stations, comprising:

a measuring section measuring a downstream transmission loss using a pilot signal that is transmitted from each of the radio base stations; and a selecting section selecting, as a destination to which a call request is transmitted or a handover destination, a radio base station that transmits a pilot signal at a lowest transmitting power among radio base stations of which downstream transmission losses are smaller than $L1+\gamma$, wherein $L1$ is a lowest downstream transmission loss among downstream losses measured by the measuring section and $\gamma$ is a positive value, when a difference between said lowest downstream transmission loss and a second lowest downstream transmission loss is smaller than a prescribed value.

2. A method for use in a mobile terminal which is used in a mobile communication system in which a plurality of wireless zones is formed by a plurality of radio base stations, the method comprising:

measuring a downstream transmission loss using a pilot signal that is transmitted from each of the radio base stations; and selecting, as a destination to which a call request is transmitted or a handover destination, a radio base station that transmits a pilot signal at a lowest transmitting power among radio base stations of which downstream transmission losses are smaller than $L1+\gamma$, wherein $L1$ is a lowest downstream transmission loss among downstream losses and $\gamma$ is a positive value, when a difference between said lowest downstream transmission loss and a second lowest downstream transmission loss is smaller than a prescribed value.

* * * * *